(12) United States Patent
Kaneko et al.

(10) Patent No.: US 6,958,827 B1
(45) Date of Patent: Oct. 25, 2005

(54) IMAGE READING APPARATUS AND METHOD AND STORAGE MEDIUM

(75) Inventors: Kiyoshi Kaneko, Yokohama (JP); Tadashi Yamamoto, Yokohama (JP); Akihiko Nakatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 09/677,509

(22) Filed: Oct. 2, 2000

(30) Foreign Application Priority Data

Oct. 6, 1999 (JP) .................................. 11-285942
Aug. 30, 2000 (JP) .............................. 2000-261617

(51) Int. Cl.⁷ ............................................ G06F 15/00

(52) U.S. Cl. .................... 358/1.2; 358/296; 358/297
(58) Field of Search ........................ 358/1.2, 296, 297, 358/474, 401, 445, 461–462; 346/140.1, 346/141

(56) References Cited

U.S. PATENT DOCUMENTS

| 5,146,351 A | 9/1992 | Maehara ..................... 358/448 |
| 5,909,247 A | 6/1999 | Hosokai et al. ............. 348/302 |
| 6,353,485 B1 * | 3/2002 | Kaneko ...................... 358/1.2 |

FOREIGN PATENT DOCUMENTS

| EP | 0 336 403 A2 | 10/1989 | ............ H04N 1/40 |
| EP | 0 641 115 A1 | 3/1995 | ........... H04N 1/024 |
| EP | 0 886 429 A2 | 12/1998 | ............ H04N 1/04 |

* cited by examiner

Primary Examiner—Twyler Lamb
(74) Attorney, Agent, or Firm—Morgan & Finnegan, L.L.P.

(57) ABSTRACT

The invention provides an image reading apparatus for performing high-precision image read by canceling out noise based on digital signal processing and superimposed on an effective portion of an analog signal. The image reading apparatus superimposes digital-based data and data-clock-based fixed noise on an sensor output signal in reference data acquiring operation as well to output data with the fixed data being canceled out in image read-operation.

16 Claims, 10 Drawing Sheets

IMAGE READING APPARATUS AND METHOD AND STORAGE MEDIUM

FIELD OF THE INVENTION

The present invention relates to an image reading apparatus mounted on a printer so as to be interchangeable with a printhead, an image reading method, and a storage medium.

BACKGROUND OF THE INVENTION

General ink-jet printers have served only as printers equipped with printheads to print images.

In contrast to this, a printer also having a scanner function by detachably mounting an image reading apparatus (scanner unit) on the carriage unit of the printer is known (see, for example, Japanese Patent Publication Nos. 1-20832, 2-21712, and 2-21711).

An image reading apparatus for outputting image data in one output form such as a serial output or 8-bit parallel output form has been used.

When the read data amount varies for each resolution, however, since the conventional image reading apparatus having only one output form has a low degree of flexibility in processing speed, power consumption associated with the processing speed, noise removing effect, and the like, high-precision image read cannot be performed.

More specifically, the image data read by the sensor in a required storage time must be transmitted as digital data. However, since an optimal combination of power consumption, processing speed, noise prevention, and the like cannot be selected, complicated control processing is required, resulting in low processing speed.

In addition, it is difficult to process noise based on digital signal processing and superimposed on an analog signal as a sensor output, i.e., noise (fixed noise) based on digital signal processing in a so-called analog/digital signal hybrid circuit. For this reason, high-precision image read cannot be performed.

SUMMARY OF THE INVENTION

It is an object of the present invention to provide an image reading apparatus and method which can read a high-quality image with a high precision and high S/N ratio by canceling out noise based on digital signal processing and superimposed on the effective portion of an analog signal.

In order to solve the above problems and achieve the above object, an image reading apparatus of the present invention is characterized by the following arrangement according to its first aspect.

There is provided an image reading apparatus for outputting a difference between read data acquired by reading an image and reference data acquired by reading a reference image as image data, comprising resolution setting means for setting a resolution in the image read, read data acquiring means for acquiring the read data in number corresponding to the set resolution, output clock generating means for generating an output clock for outputting the image data in the image read, dummy clock generating means for generating a dummy clock for the output clock when the reference data is to be acquired by reading the reference image, and timing setting means for matching a timing of the output clock with a timing of the dummy clock in an interval during which the image is read and read data is output.

An image reading apparatus of the present invention is characterized by the following arrangement according to its second aspect.

There is provided an image reading apparatus which is mounted on a printer so as to be interchangeable with a printhead, comprising image read means for reading an image of an original placed on said printer, output means capable of outputting the read image data in a serial output form and a plurality of parallel output forms, and output form selecting means for selecting the output form.

An image reading apparatus of the present invention is characterized by the following arrangement according to its third aspect.

There is provided an image reading apparatus which is mounted on a printer so as to be interchangeable with a printhead, comprising image read means for reading an image of an original placed on said printer, clock generating means for generating an output clock for outputting the read image data, and clock frequency changing means for changing a frequency of the output clock.

An image reading apparatus of the present invention is characterized by the following arrangement according to its fourth aspect.

There is provided an image reading apparatus which is mounted on a printer so as to be interchangeable with a printhead, comprising image read means for reading an image of an original placed on said printer, and driving frequency changing means for changing a driving frequency for said image read means.

An image reading method of the present invention is characterized by the following process according to its first aspect.

There is provided an image reading method of outputting a difference between read data acquired by reading an image and reference data acquired by reading a reference image as image data, comprising the step of setting a resolution in the image read, the step of acquiring the read data in number corresponding to the set resolution, the step of generating an output clock for outputting the image data in the image read, the step of generating a dummy clock for the output clock when the reference data is to be acquired by reading the reference image, and the step of matching a timing of the output clock with a timing of the dummy clock in an interval during which the image is read and read data is output.

An image reading apparatus of the present invention is characterized by the following arrangement according to its fifth aspect.

There is provided an image reading apparatus comprising image read means for reading an image, serial output means for outputting the image data read by said image read means in a serial form, and a plurality of parallel output means for outputting the image data read by said image read means in a plurality of types of parallel forms.

An image reading apparatus of the present invention is characterized by the following arrangement according to its sixth aspect.

There is provided an image reading apparatus comprising image read means for reading an image, clock generating means for generating a clock signal for outputting the image data read by said image read means, and clock changing means for changing a frequency of the clock signal in accordance with the read resolution of said image read means.

An image reading apparatus of the present invention is characterized by the following arrangement according to its seventh aspect.

There is provided an image reading apparatus for outputting a difference between read data acquired by reading an image and reference data acquired by reading a reference image as image data, comprising image read means for reading an image, output clock generating means for generating an output clock signal for outputting the image data read by said image read means, and dummy clock generating means for generating a dummy clock similar to the output clock signal when the reference image is to be read.

An image reading apparatus of the present invention is characterized by the following arrangement according to its eighth aspect.

There is provided an image reading apparatus comprising image read means for reading an image, and driving frequency changing means for changing a driving frequency for a photoelectric conversion sensor mounted in said image read means.

An image reading apparatus of the present invention is characterized by the following arrangement according to its ninth aspect.

There is provided an image reading apparatus for outputting a difference between read data acquired by reading an image and reference data acquired by reading a reference image as image data, comprising image read means for reading an image, serial output means for outputting the image data read by said image read means in a serial form, a plurality of parallel output means for outputting the image data read by said image read means in a plurality of types of parallel forms, switching means for switching said plurality of parallel output means, output clock generating means for generating an output clock signal for outputting the image data read by said image read means, output clock changing means for changing a frequency of the output clock signal, dummy clock generating means for generating a dummy clock similar to the output clock signal when the reference image is to be read, and driving frequency changing means for changing a driving frequency for a photoelectric conversion sensor mounted in said image read means, wherein fixed noise is removed from an output signal from said photoelectric conversion sensor by using said serial output means, said parallel output means, said switching means, said output clock generating means, said output clock changing means, said dummy clock generating means, and said driving frequency changing means.

An image reading apparatus of the present invention is characterized by the following arrangement according to its tenth aspect.

There is provided an image reading apparatus for outputting a difference between read data acquired by reading an image and reference data acquired by reading a reference image as image data, comprising image read means for reading an image output clock generating means for generating an output clock signal for outputting the image data read by said image read means, clock changing means for changing a frequency of the clock signal in accordance with a read resolution of said image read means, and dummy clock generating means for generating a dummy clock having the same frequency as that of the output clock signal which is changed by said clock changing means when the reference image is to be read.

An image reading method of the present invention is characterized by the following process according to its second aspect.

There is provided an image reading method comprising the image read step of reading an image, and the step of selecting one of output means in a serial form and output means in a plurality of types of parallel forms to output the image data read in the image read step.

An image reading method of the present invention is characterized by the following process according to its third aspect.

There is provided an image reading method comprising the image read step of reading an image, the clock generating step of generating a clock signal for outputting the image data read in the image read step, and the clock changing step of changing a frequency of the clock signal in accordance with a read resolution in the image read step.

An image reading method of the present invention is characterized by the following process according to its fourth aspect.

There is provided an image reading method of outputting a difference between read data acquired by reading an image and reference data acquired by reading a reference image as image data, comprising the image read step of reading an image, the output clock generating step of generating an output clock signal for outputting the image data read in the image read step, and the dummy clock generating step of generating a dummy clock similar to the output clock signal when the reference image is to be read.

An image reading method of the present invention is characterized by the following process according to its fifth aspect.

There is provided an image reading method comprising the image read step of reading an image by using image read means, and the driving frequency changing step of changing a driving frequency for a photoelectric conversion sensor mounted in the image read means.

An image reading method of the present invention is characterized by the following process according to its sixth aspect.

There is provided an image reading method of reading an image by using an image reading apparatus which outputs a difference between read data acquired by reading an image and reference data acquired by reading a reference image as image data and includes image read means for reading an image, serial output means for outputting the image data read by the image read means in a serial form, a plurality of parallel output means for outputting the image data read by the image read means in a plurality of types of parallel forms, switching means for switching the plurality of parallel output means, output clock generating means for generating an output clock signal for outputting the image data read by the image read means, output clock changing means for changing a frequency of the output clock signal, dummy clock generating means for generating a dummy clock similar to the output clock signal when the reference image is to be read, and driving frequency changing means for changing a driving frequency for a photoelectric conversion sensor mounted in the image read means, comprising removing fixed noise from an output signal from the photoelectric conversion sensor by using the serial output means, the parallel output means, the switching means, the output clock generating means, the output clock changing means, the dummy clock generating means, and the driving frequency changing means.

An image reading method of the present invention is characterized by the following process according to its seventh aspect.

There is provided an image reading method comprising the image read step of reading an image, the clock generating step of generating a clock signal for outputting the image data read in the image read step, and the removing step of removing the image data in a portion where a read timing of image data in the image read step differs from a timing of the clock signal for outputting the image data.

An image reading method of the present invention is characterized by the following process according to its eighth aspect.

There is provided an image reading method of outputting a difference between read data acquired by reading an image and reference data acquired by reading a reference image as image data, comprising the image read step of reading an image, the output clock generating step of generating an output clock signal for outputting the image data read in the image read step, the clock changing step of changing a frequency of the clock signal in accordance with a read resolution of the image read means, and the dummy clock generating step of generating a dummy clock having the same frequency as that of the output clock signal which is changed in the clock changing step when the reference image is to be read.

A storage medium of the present invention is characterized by the following arrangement according to its first aspect.

There is provided a storage medium storing a control program for controlling an image reading apparatus, wherein the control program comprises a code for the image read step of reading an image, and a code for the step of selecting one of output means in a serial form and output means in a plurality of types of parallel forms to output the image data read in the image read step.

A storage medium of the present invention is characterized by the following arrangement according to its second aspect.

There is provided a storage medium storing a control program for controlling an image reading apparatus, wherein the control program comprises a code for the image read step of reading an image, a code for the clock generating step of generating a clock signal for outputting the image data read in the image read step, and a code for the clock changing step of changing a frequency of the clock signal in accordance with a read resolution in the image read step.

A storage medium of the present invention is characterized by the following arrangement according to its third aspect.

There is provided a storage medium storing a control program for controlling an image reading apparatus for outputting a difference between read data acquired by reading an image and reference data acquired by reading a reference image as image data, wherein the control program comprises a code for the image read step of reading an image, a code for the output clock generating step of generating an output clock signal for outputting the image data read in the image read step, and a code for the dummy clock generating step of generating a dummy clock similar to the output clock signal when the reference image is to be read.

A storage medium of the present invention is characterized by the following arrangement according to its fourth aspect.

There is provided a storage medium storing a control program for controlling an image reading method, wherein the control program comprises a code for the image read step of reading an image by using image read means, and a code for the driving frequency changing step of changing a driving frequency for a photoelectric conversion sensor mounted in the image read means.

A storage medium of the present invention is characterized by the following arrangement according to its fifth aspect.

There is provided a storage medium storing a control program for controlling an image reading apparatus which outputs a difference between read data acquired by reading an image and reference data acquired by reading a reference image as image data and includes image read means for reading an image, serial output means for outputting the image data read by the image read means in a serial form, a plurality of parallel output means for outputting the image data read by the image read means in a plurality of types of parallel forms, switching means for switching the plurality of parallel output means, output clock generating means for generating an output clock signal for outputting the image data read by the image read means, output clock changing means for changing a frequency of the output clock signal, dummy clock generating means for generating a dummy clock similar to the output clock signal when the reference image is to be read, and driving frequency changing means for changing a driving frequency for a photoelectric conversion sensor mounted in the image read means, wherein the control program comprises a code for the step of removing fixed noise from an output signal from the photoelectric conversion sensor by using the serial output means, the parallel output means, the switching means, the output clock generating means, the output clock changing means, the dummy clock generating means, and the driving frequency changing means.

A storage medium of the present invention is characterized by the following arrangement according to its sixth aspect.

There is provided a storage medium storing a control program for controlling an image reading apparatus, wherein the control program comprises a code for the image read step of reading an image, a code for the clock generating step of generating a clock signal for outputting the image data read in the image read step, and a code for the removing step of removing the image data in a portion where a read timing of image data in the image read step differs from a timing of the clock signal for outputting the image data.

A storage medium of the present invention is characterized by the following arrangement according to its seventh aspect.

There is provided a storage medium storing a control program for controlling an image reading apparatus for outputting a difference between read data acquired by reading an image and reference data acquired by reading a reference image as image data, wherein the control program comprises a code for the image read step of reading an image, a code for the output clock generating step of generating an output clock signal for outputting the image data read in the image read step, a code for the clock changing step of changing a frequency of the clock signal in accordance with a read resolution of the image read means, and a code for the dummy clock generating step of generating a dummy clock having the same frequency as that of the output clock signal which is changed in the clock changing step when the reference image is to be read.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

An image reading apparatus and method according to an embodiment of the present invention will be described. The image reading apparatus according to this embodiment is applied to an ink-jet printer, on which the image reading apparatus is mounted so as to be interchangeable with a printhead.

First Embodiment

Figure 1:
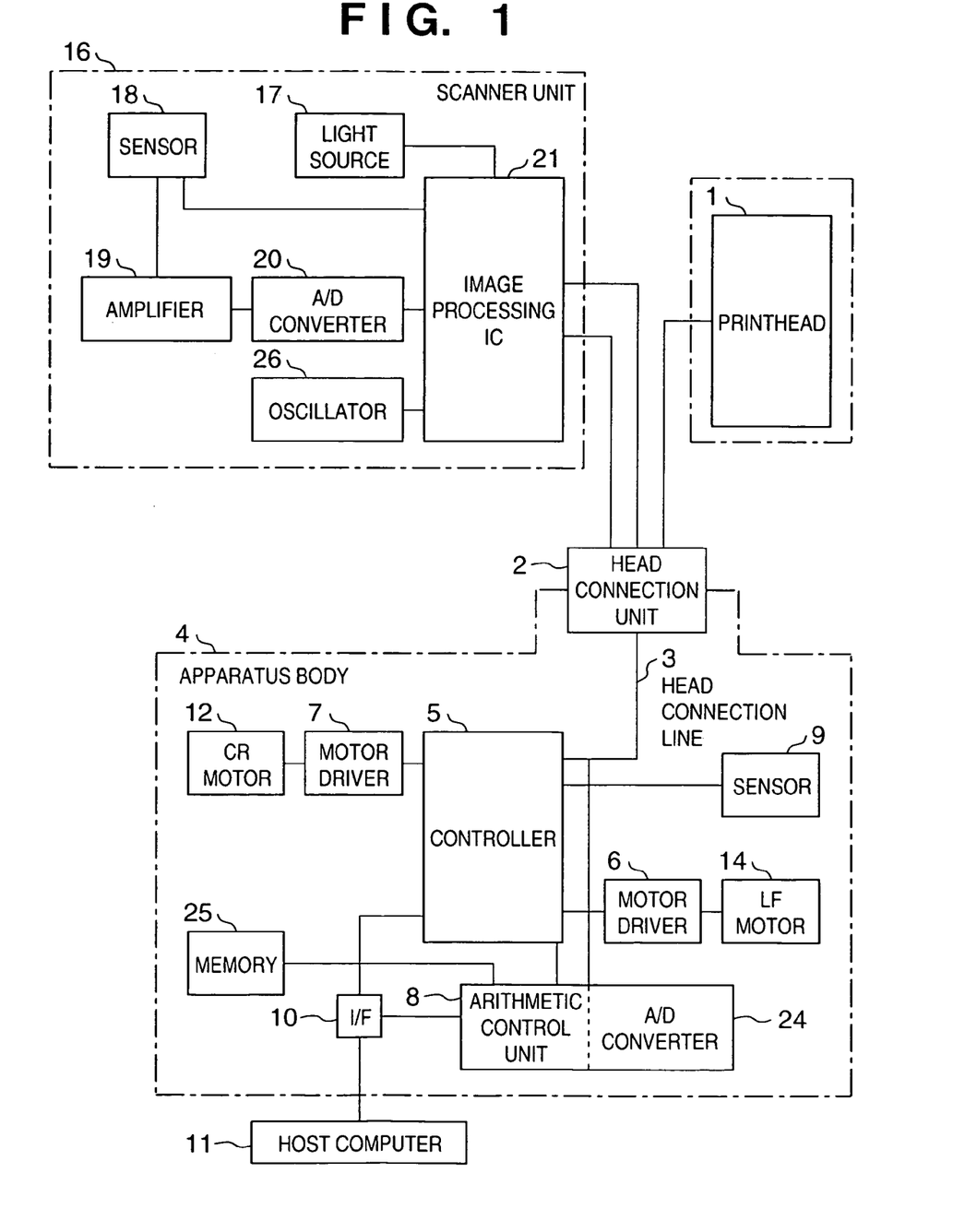
FIG. 1 is a block diagram showing the arrangement of an ink-jet printer.

FIG. 1 is a block diagram showing the arrangement of an ink-jet printer. This ink-jet printer includes an apparatus body 4 connected to a printhead 1 through an interface 10, and a printhead 1 and scanner unit 16 which are interchangeably connected to a head connection unit 2.

The apparatus body 4 includes the head connection unit 2, a head connection line 3, a controller 5, motor drivers 6 and 7, an arithmetic control unit 8, a sensor 9, the interface (I/F) 10, a CR motor 12, an LF motor 14, an A/D converter 24, a memory 25, and the like.

The scanner unit 16 includes a light source 17, sensor 18, A/D converter 20, image processing IC 21, and oscillator 26.

In the ink-jet printer having this arrangement, print data such as character and image data is transferred from the host computer 11 through the interface (I/F) 10 under the control of the host computer 11 and arithmetic control unit 8. Upon reception of print data, the controller 5 processes the data to print it on printing paper (not shown) by using the printhead 1. The controller 5 sends the print data to the printhead 1 through the head connection line 3 and head connection unit 2 under the control of the arithmetic control unit 8, thereby printing characters, images, and the like on printing paper by using the printhead 1.

Figure 2:
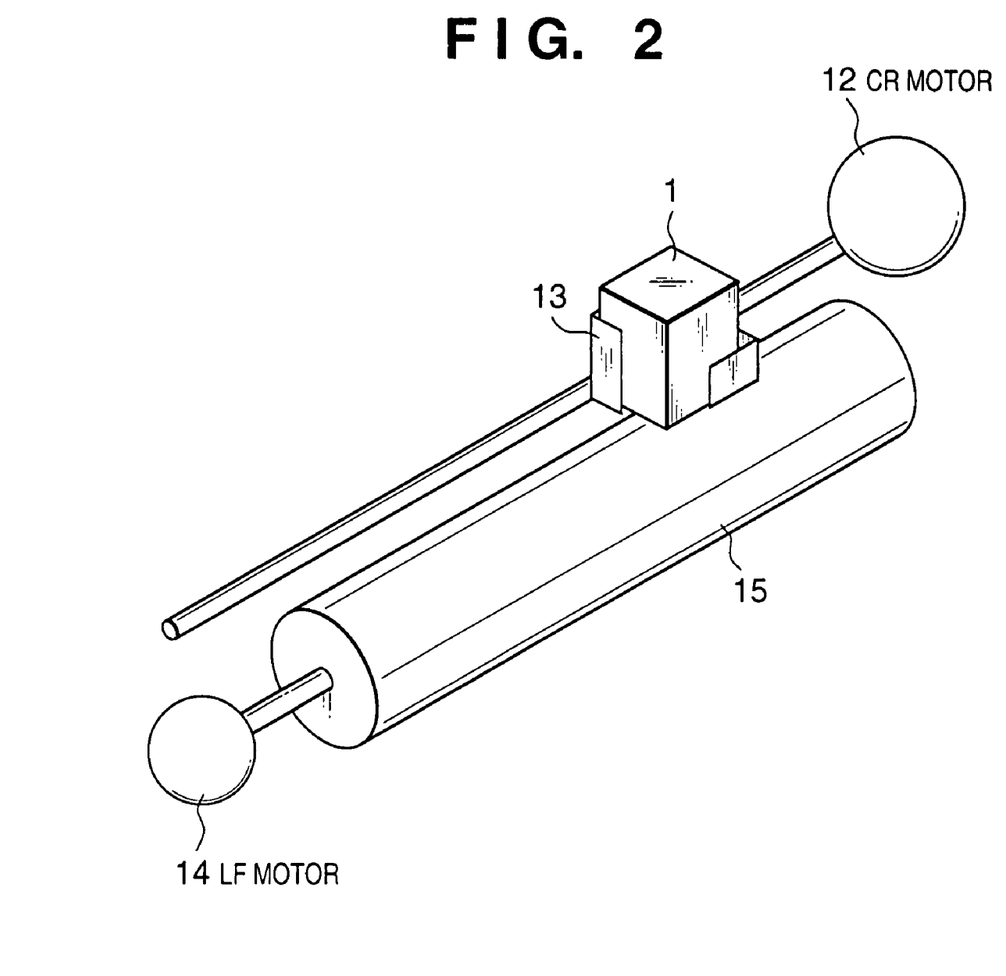
FIG. 2 is a view showing the arrangement of the main part of a printing mechanism unit.

FIG. 2 is a view showing the arrangement of the main part of a printing mechanism unit. A cylindrical body 15 is a platen which is rotated by a driving mechanism (not shown) controlled by the arithmetic control unit 8, controller 5, and motor driver 6 after a printing paper sheet is brought into rolling contact with the platen. This platen feeds the printing paper sheet and serves as a printing base for supporting the printing paper sheet.

A carriage 13 is disposed near the outer surface of the platen 15 so as to be movable along the axial direction of the platen 15. The carriage 13 holds the printhead 1 in printing operation and the scanner unit (image reading apparatus) 16 (to be described later) in image read operation, and carries them along a printing paper sheet and the surface of an image read original. The carriage 13 is moved by a carriage driving mechanism unit (not shown) controlled by the arithmetic control unit 8, controller 5, and motor drivers 6 and 7.

The sensor 9 detects whether a printing paper sheet or image read original is set on a paper base (not shown) or the carriage 13 is at the start position. Printing operation is performed by using this printing mechanism unit.

When this apparatus (ink-jet printer) operates as an image reading apparatus, the scanner unit 16 scans an original (not shown) like the printhead 1 in printing operation.

The scanner unit 16 illuminates the original with light from the light source 17 and detects light reflected by a character or image through the sensor 18 having a photoelectric conversion feature. The amplifier 19 amplifies the image signal detected by the sensor 18 to an optimal level at which the signal can be treated by the A/D converter 20, and inputs the amplified signal to the A/D converter 20. The digital data converted by the A/D converter 20 is subjected to correction such as shading correction (unevenness correction) or binarization or image processing in the image processing IC 21. The resultant data is then transferred as image data to the apparatus body 4.

In this data transfer, the data is sent to the host computer 11 through a reverse route to the flow of print data in printing operation. More specifically, the image data is sent from the image processing IC 21 to the host computer 11 through the head connection line 3, controller 5, and interface 10. In this case, the controller 5 converts the form of the image data received from the image processing IC 21 into a form that allows the data to be easily sent through the interface 10 or a form that allows data to be easily handled by the host computer 11, and transfers the data under the control of the arithmetic control unit 8.

To read an image, the printing mechanism unit operates in almost the same manner as in printing operation. More specifically, an image read original is brought into rolling contact with the platen 15, and the platen 15 is rotated by the driving mechanism (not shown) to feed the original as in printing operation. The platen 15 also serves as an original base for supporting the original. The carriage 13 on which the scanner unit 16 is mounted conveys the scanner unit 16 along the surface of the image read original to read an image. As in printing operation, the carriage 13 is driven by the carriage driving mechanism unit (not shown). The sensor 9 operates in the same manner as described above. As described above, in image read operation as well, the printing mechanism unit operates in the same manner as in printing operation.

Figure 3:
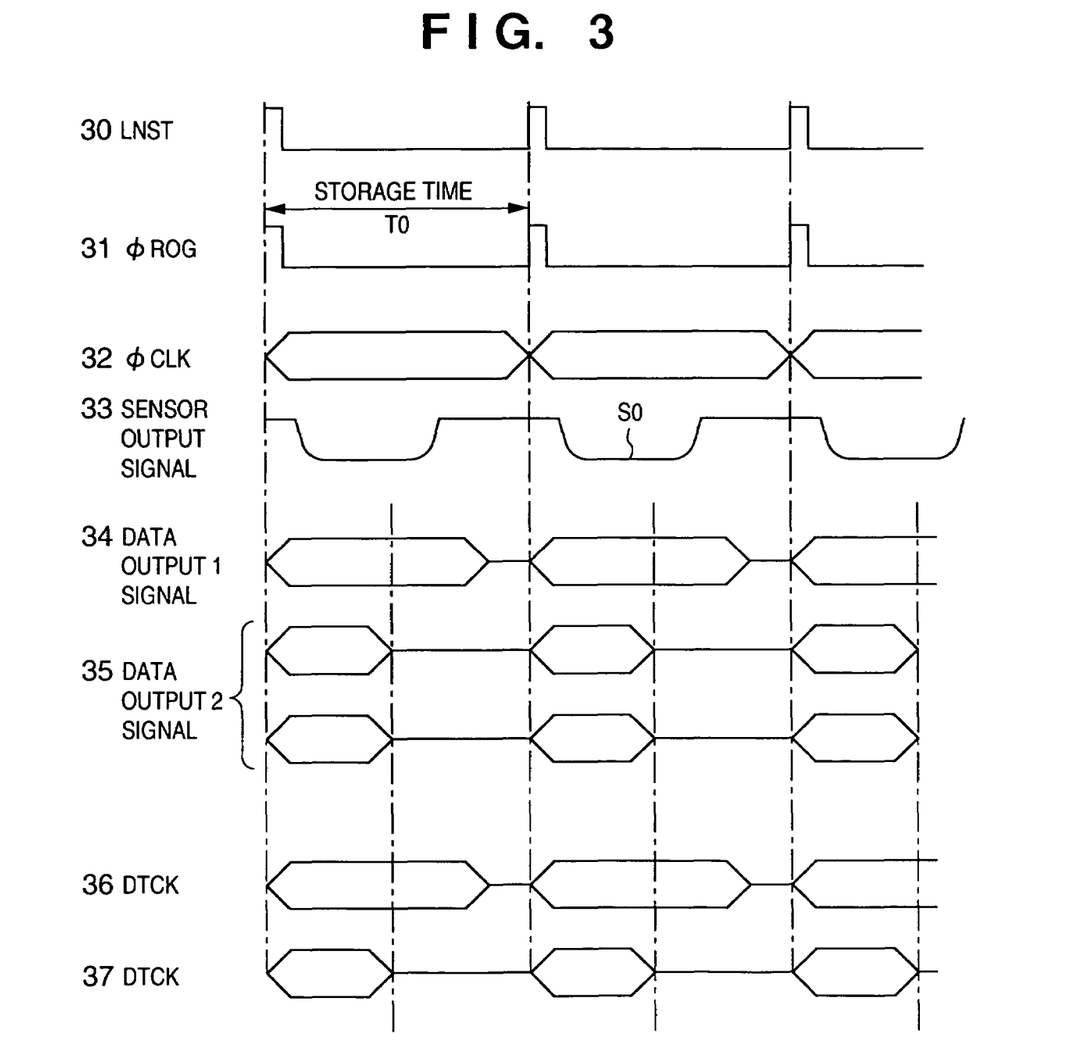
FIG. 3 is a timing chart showing changes in signals at the respective units in image read operation.

FIG. 3 is a timing chart showing changes in signals at the respective units in image read operation. In image read operation, an LNST signal 30 supplied from the apparatus body 4 and used to set a read cycle and storage time becomes a temporal reference signal for the operation of each block.

This LNST signal 30 is generated by the arithmetic control unit 8 and controller 5 in the apparatus body 4, and is input to the image processing IC 21 through the head connection unit 2. The image processing IC 21 has the oscillator 26. All logic operations in the scanner unit 16 are performed in synchronism with clock pulses from the oscillator 26. More specifically, the LNST signal 30 input to the image processing IC 21 synchronizes clock pulses from the oscillator 26, and the image processing IC 21 generates a signal φ ROG 31 for driving the sensor 18.

At the same time, the image processing IC 21 generates a clock φ CLK 32 for driving the sensor 18, and sends it to the sensor 18, together with the signal φ ROG 31. The clock φ CLK 32 and signal φ ROG 31 are synchronous with each other. In a cycle of the signal φ ROG 31, the sensor 18 reads, for example, a white image, and outputs a corresponding sensor output signal 33. A portion S0 of the sensor output signal 33 in FIG. 3 is the information signal read by the sensor 18 in a storage time T0. The sensor output signal 33 is a signal for outputting 1-pixel information per clock pulse of the clock φ CLK 32. If the sensor 18 is a 256-pixel sensor and the clock φ CLK 32 is a 1-MHz clock, the sensor output signal 33 is kept output for 256 pixels×(1/1 MHz)=256 μsec. Likewise, if the clock φ CLK 32 is a 2-MHz clock, the sensor output signal 33 is kept output for 256 pixels×(1/2 MHz)=128 μsec.

Figure 4:
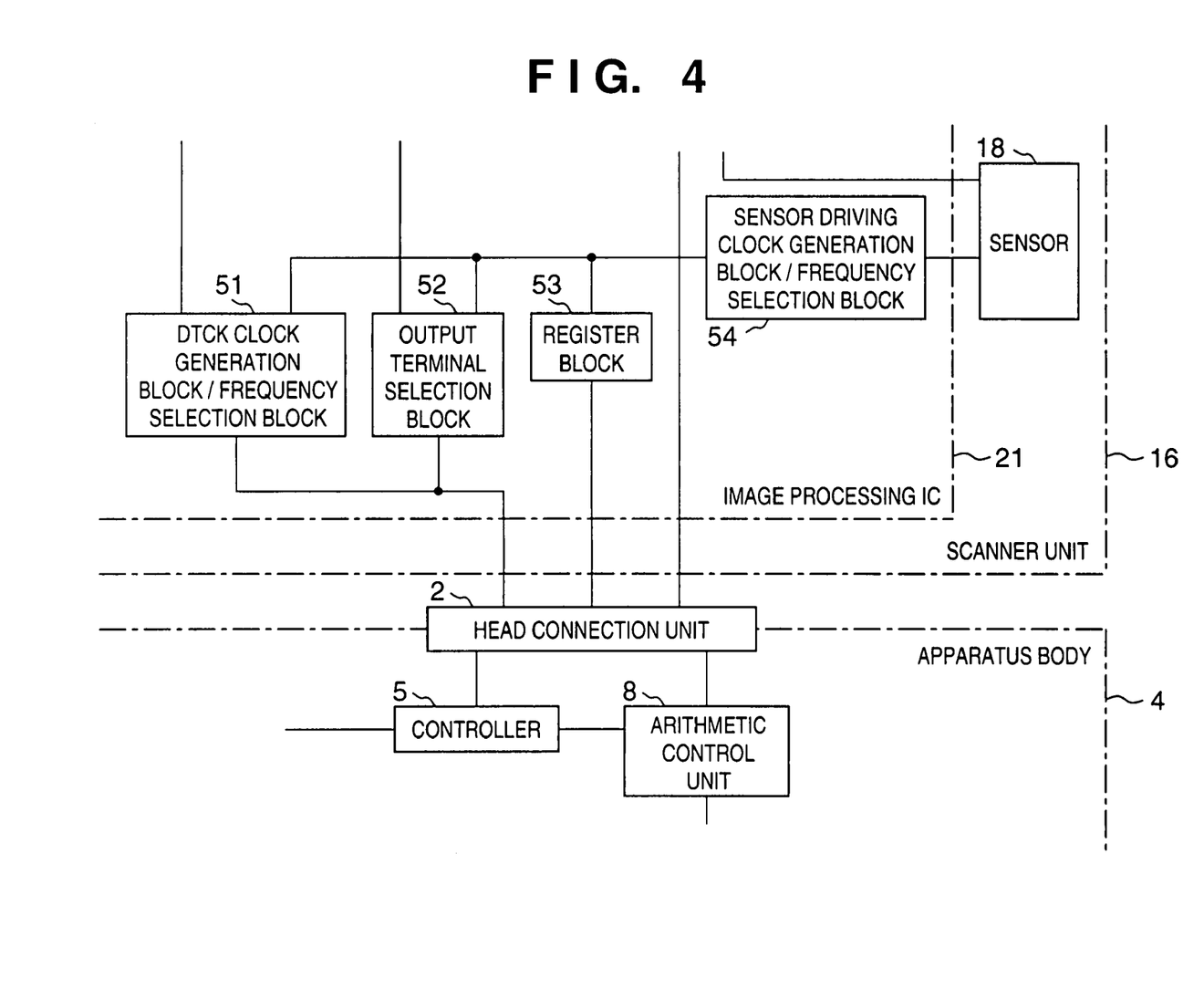
FIG. 4 is a block diagram showing the arrangement of part of an image processing IC 21.

A plurality of clock frequencies can be selected for the clock φ CLK 32 in accordance with an instruction such as register setting instruction from the arithmetic control unit 8 to the image processing IC 21. FIG. 4 is a block diagram showing the arrangement of part of the image processing IC 21. The image processing IC 21 includes a DTCK clock generation block/frequency selection block 51, output terminal selection block 52, register block 53, sensor driving clock generation block/frequency selection block 54, and the like. A clock frequency is selected from the clock φ CLK 32 by instructing the sensor driving clock generation block/frequency selection block 54 to set a register value.

The sensor output signal 33 is an analog signal having a level of about several mV to several ten mV. This sensor output signal 33 is amplified by the amplifier 19 to an appropriate level for conversion from an analog signal to a digital signal. The amplified signal is converted into digital data by the A/D converter 20. The digital data is input to the image processing IC 21. The image processing IC 21 performs image data processing such as unevenness correction, and outputs the resultant data.

In this case, the image processing IC 21 has eight output terminals to allow 1-bit output as a serial output form and 2-bit output, 4-bit output, and 8-bit output as parallel output forms.

In selecting one of these output forms, the number of output terminals is set for the image processing IC 21 in accordance with an instruction such as a register setting instruction from the arithmetic control unit 8 or controller 5. By selecting a plurality of output terminals as needed, an output time for a data output 1 signal 34 can be selected in accordance with the number of output terminals. More specifically, the data output 1 signal 34 is selected for 1-bit output. If a data output 2 signal 35 for 2-bit output is selected, data output operation can be completed in 1/2 the time required for the data output 1 signal 34. Likewise, the time required for data output operation can be decreased to 1/4 if 4-bit output is selected, and decreased to 1/8 if 8-bit output is selected.

In addition, a plurality of clock frequencies can be selected for a clock DTCK 36 in data output operation. The clock DTCK 36 is kept output for a time equivalent to the number of clock pulses corresponding to the data amount of data output. Assume that the clock DTCK 36 for the data output 1 signal 34 is a clock that can be output at a frequency of 2 MHz. In this case, if the clock frequency is set to 4 MHz, data transfer can be performed in 1/2 the time as in the case of a clock DTCK 37.

As in the data output terminal selecting/setting operation, this clock frequency selecting/setting operation is performed for the DTCK clock generation block/frequency selection block 51 of the image processing IC 21 in accordance with an instruction such as a register setting instruction from the arithmetic control unit 8 or controller 5.

Data output operation in acquiring reference data (reference image read data) from a white correction plate will be described next. If, for example, a reference image such as a white correction plate is read in acquiring reference data, the acquired reference data is directly stored in a reference data memory (not shown) in the image processing IC 21. That is, in reading reference data, no data output and data output clock DTCK are required for an output such as a data output terminal. For this reason, acquired reference data is read out from the reference data memory.

As described above, however, the sensor output signal 33 is an analog signal having only an output voltage of about several mV to several ten mV, and hence is susceptible to disturbances. Spike-like noise produced by a data output and data output clock DTCK, in particular, affects the power supply system and ground system, and is superimposed on the output waveform of the sensor output signal 33. It is known that this noise itself is difficult to remove.

In order to eliminate the influences of such noise, the data output clock DTCK is also output as a pseudo dummy clock in reference data acquiring operation as in normal image read operation. In this manner, as in image read operation, almost identical noise is also superimposed on the sensor output signal 33 in reference data acquiring operation to cancel out (remove) spike-like noise (fixed noise) produced by the data output clock DTCK.

That is, normal image read data expresses the difference between the level of the sensor output signal 33 in reference data acquiring operation and the level of the sensor output signal 33 in image read operation (unevenness correction or the like in the image processing IC 21), and hence image read data is output while fixed noise produced by the data output clock DTCK is removed.

The generation of this dummy clock is set in the register block 53 in the image processing IC 21 by the arithmetic control unit 8, and the dummy clock is output from the DTCK clock generation block/frequency selection block 51.

As described above, this apparatus is configured to select the number of data output bits, select a data clock frequency, select a sensor driving frequency, and generate a dummy clock in reference data acquiring operation. A method of removing digital-based data and data-clock-based fixed noise which are superimposed on an output signal from the sensor 18 in this arrangement will be described.

Figure 5:
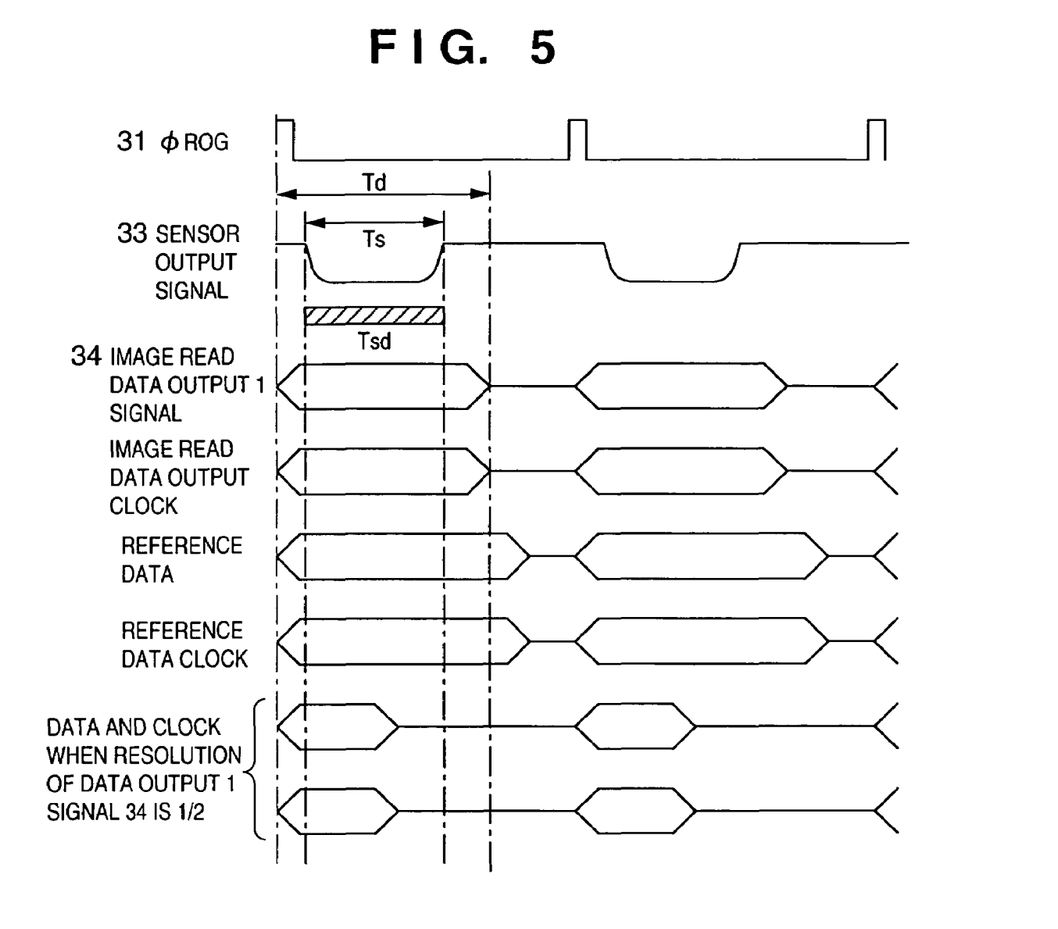
FIG. 5 is a timing chart showing changes in signals at the respective units in data output operation.

This fixed noise removing method has been described to a certain degree in association with the description about the arrangement capable of generating a dummy clock in reference data acquiring operation, but will be described again. FIG. 5 is a timing chart showing changes in signals at the respective units in data output operation.

A time Tsd is produced as a signal output timing, in which output operation is performed at the same timing in an image read data output time Td as in an output time Ts of the sensor output signal 33. Digital-based data and data-clock-based fixed noise are superimposed on the sensor output signal 33 in this time Tsd.

In this case, in reference data acquiring operation as well, digital-based data and data-clock-based fixed noise are superimposed on the sensor output signal 33 to obtain a data output whose fixed noise is canceled out when the image read data is output. In reference data acquiring operation, reference data is acquired throughout all the pixels (256 pixels) of the sensor 18. In image read operation, however, the number of image data varies depending on the read resolution. In this embodiment, for example, since the sensor 18 and optical system are based on a reference resolution of 720 dpi, when a reduced resolution, e.g., 360 dpi, 180 dpi, or 90 dpi is to be obtained, the image processing IC 21 performs averaging processing for pixel data from 720-dpi read data.

Providing that multivalued data consists of 8 bits, the number of image data in one read cycle at each resolution is:
  at 720 dpi, 256 pixels×8 bits=2,048 data
  at 360 dpi, 256 pixels×(½)×8 bits=1,024 data
  at 180 dpi, 256 pixels×(¼)×8 bits=512 data
  at 90 dpi, 256 pixels×(⅛)×8 bits=256 data The number of data in image read operation may greatly differ from that in reference data acquiring operation depending on the resolution, and the dummy clock output timing in reference data acquiring operation may differ from the data output timing in image read operation (see FIG. 5).

Figure 6:
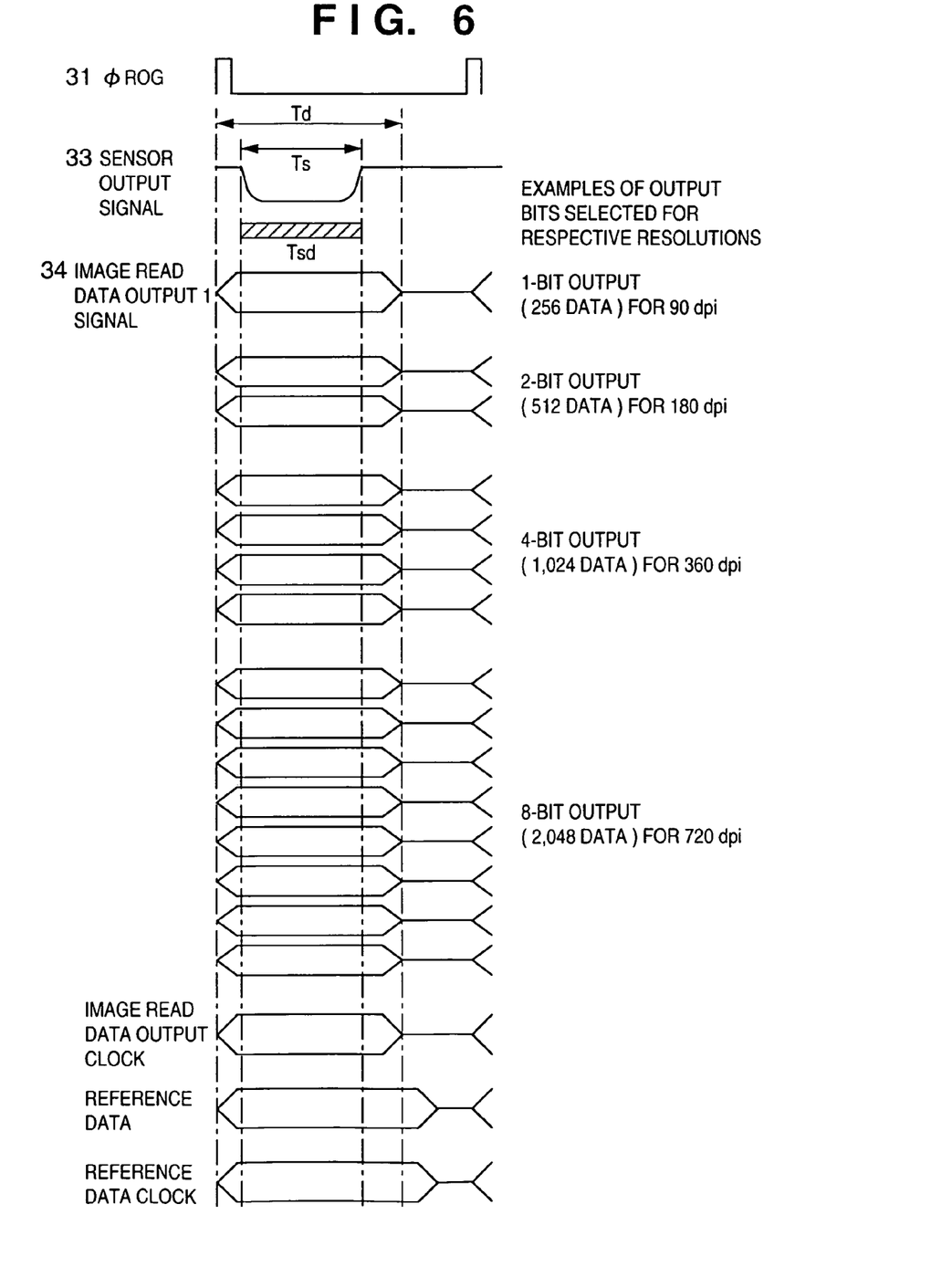
FIG. 6 is a timing chart showing clock output timings in reference data acquiring operation and clock output timings in image read operation in a case wherein appropriate timings are selected/set for each resolution by selecting the number of data output terminals.

According to the first method of matching these timings, the number of data output terminals is selected to set the 2-bit output form as a parallel output from so as to set the data output time to ½ the time required for the 1-bit output form as a serial output form. Likewise, the 4-bit output form is set to decrease the data output time to ¼, or the 8-bit output form is set to decrease the data output time to ⅛. With this operation, appropriate timings are selected/set for each resolution, with the clock output timing in reference data acquiring operation matching the data/clock output timing in image read operation. FIG. 6 is a timing chart showing clock output timings in reference data acquiring operation and clock output timings in image read operation in a case wherein appropriate timings are selected/set for each resolution by selecting the number of data output terminals. Since different data amounts are set for the respective resolutions in image read operation, output timings can be matched by selecting/setting the number of output bits.

Figure 7:
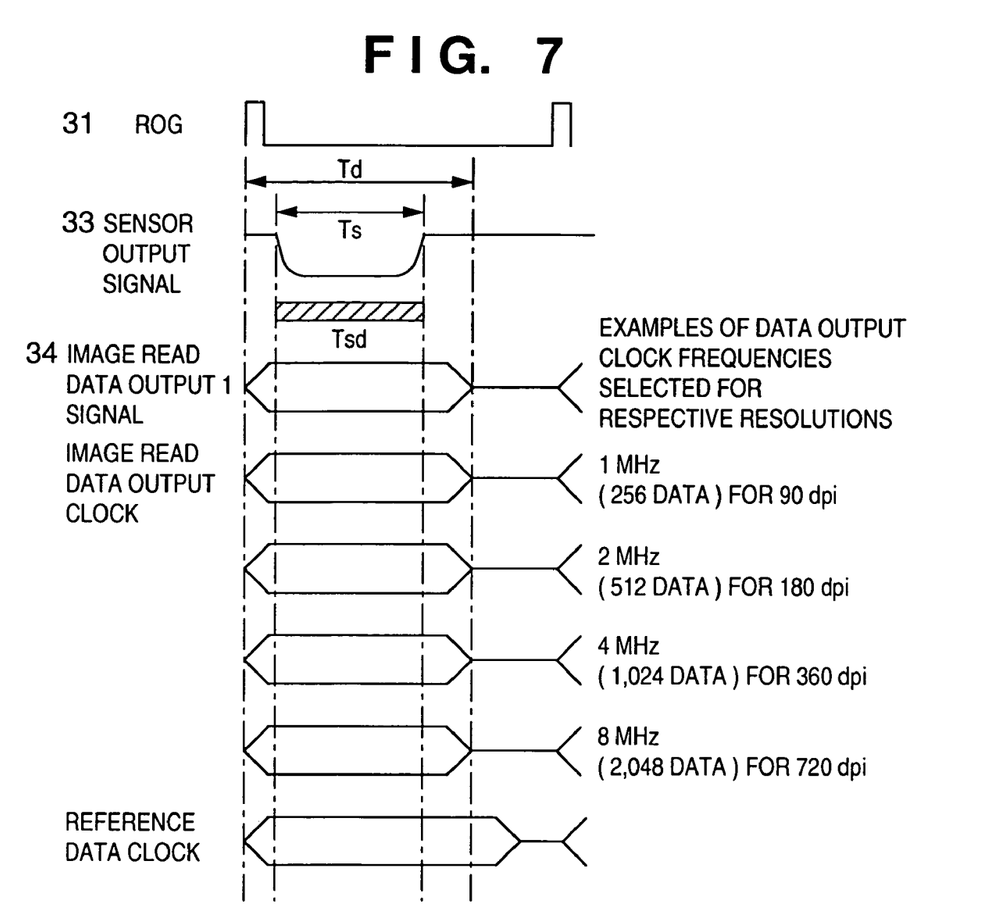
FIG. 7 is a timing chart showing clock output timings in reference data acquiring operation and clock output timings in image read operation in a case wherein appropriate timings are selected/set for each resolution by selecting a data clock frequency for each resolution.

According to the second method, timings are matched by selecting a data clock frequency for each resolution. For example,
  a clock frequency of 8 MHz is selected for 720 dpi,
  a clock frequency of 4 MHz is selected for 360 dpi,
  a clock frequency of 2 MHz is selected for 180 dpi, and
  a clock frequency of 1 MHz is selected for 90 dpi.

With this operation, the times Tsd are set to the same timing, thus appropriate timings are selected/set for each resolution, with the clock output timing in reference data acquiring operation matching the clock output timing in image read operation. FIG. 7 is a timing chart showing clock output timings in reference data acquiring operation and clock output timings in image read operation in a case wherein appropriate timings are selected/set or each resolution by selecting a data clock frequency for each resolution.

Since different data amounts are set for the respective resolutions in image read operation, output timings can be matched by selecting/setting data output clocks (DTCK). In this case, a clock for reference data in reference data acquiring operation is also output as a dummy clock, and hence a data output clock having a frequency selected for each resolution in image read operation is output.

Figure 8:
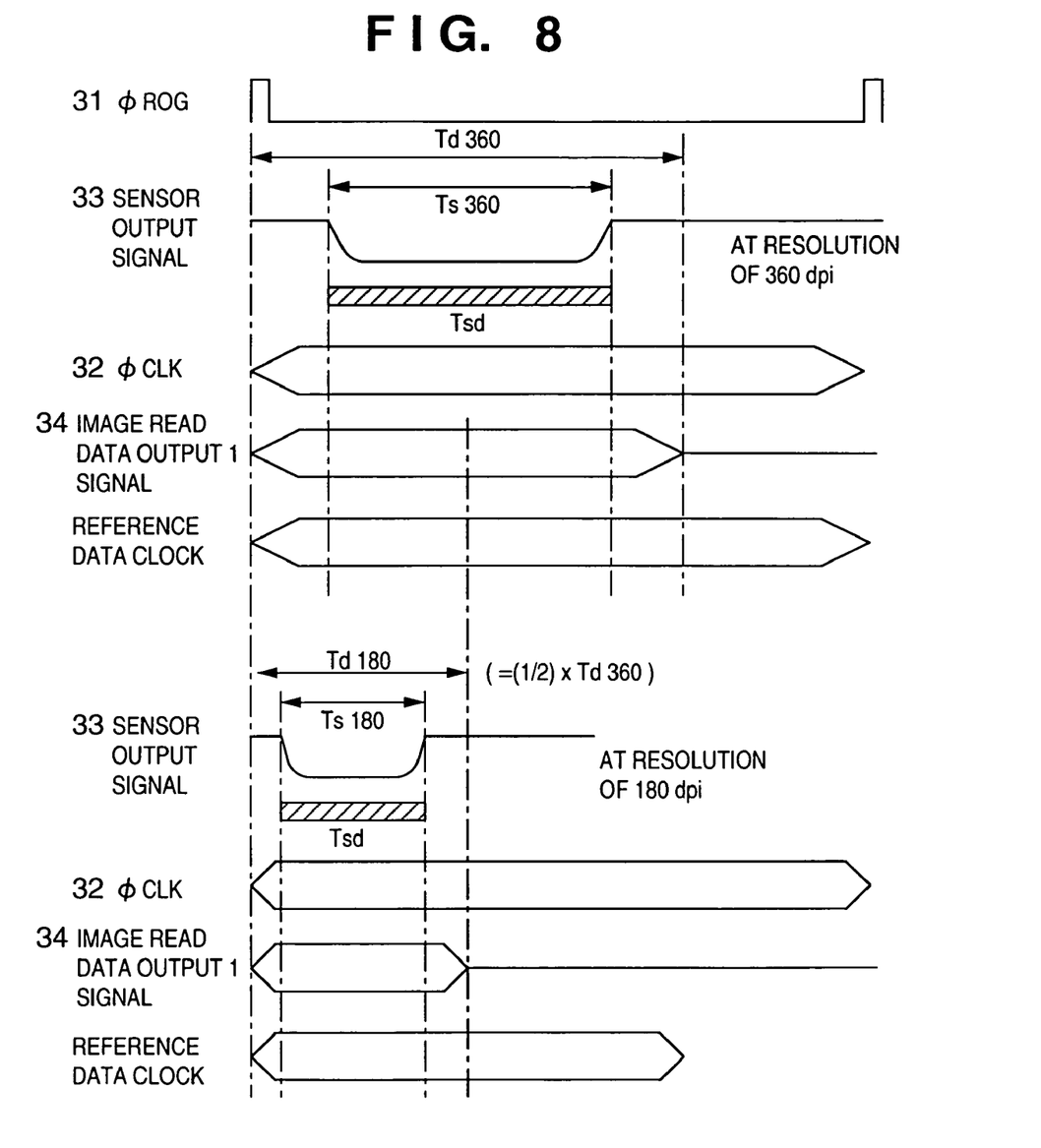
FIG. 8 is a timing chart showing clock output timings in reference data acquiring operation and clock output timings in image read operation in a case wherein a sensor driving frequency is selected/set for each resolution such that appropriate timings are set by changing the driving frequency for a sensor 18 for each resolution.

According to the third method, timings are matched by changing the driving frequency for the sensor 18 for each resolution. For example,
  a sensor driving frequency of 1 MHz is selected/set for 360 dpi, and
  a sensor driving frequency of 2 MHz is selected/set for 180 dpi.

With this operation, as shown in FIG. 8, a time Ts360 and time Td360 at 360 dpi are prolonged. However, both times Tsd in the case of 360 dpi and the case of 180 dpi with a time Ts180 and time Td180 are set to the same timing. Therefore, a sensor driving frequency is selected/set for each resolution to set appropriate timings with the clock output timing in reference data acquiring operation matching the clock output timing in image read operation. FIG. 8 is a timing chart showing a clock output timing in reference data acquiring operation and a clock output timing in image read operation in a case wherein a sensor driving frequency is selected/set for each resolution so as to set appropriate timings by changing the driving frequency for the sensor 18 for each resolution.

In this manner, high-precision, high-quality image read can be performed by selecting/setting an appropriate combination of the first, second, and third methods for each resolution in consideration of power consumption, noise removal ratio, radiation noise occurrence state, and the like.

Second Embodiment

Figure 9:
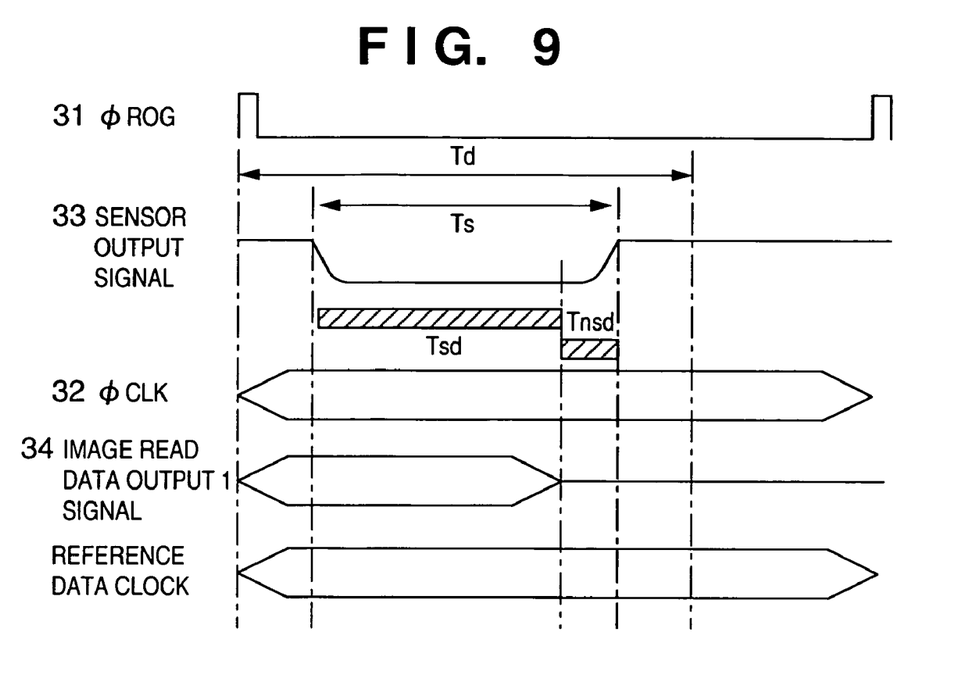
FIG. 9 is a timing chart showing changes in signals at the respective units in a case wherein the timing of a time Tsd cannot be properly set for a sensor output signal 33.

The second embodiment will exemplify the case wherein noise based on digital signal processing cannot be canceled out. When the measures described in the first embodiment cannot be taken as in a case wherein only the 1-bit output form is set because the number of data output terminals is limited by the space, cost, and the like of the apparatus, the optimal timing of a time Tsd may not be provided for a sensor output signal 33, as shown in FIG. 9. FIG. 9 is a timing chart showing changes in signals at the respective units in a case wherein the optimal timing of the time Tsd cannot be provided for the sensor output signal 33.

Referring to FIG. 9, in an interval Tnsd, only the noise in a reference data clock becomes noise based on digital signal processing, and hence clock noise in image read operation cannot be canceled out by a dummy clock in reference data acquiring operation.

If, however, the image read data in the interval Tnsd in which this noise cannot be canceled out is not used as output data, i.e., processed as invalid data to use only the portion in which noise is canceled out as final image data, image read with a high precision and high S/N ratio can be realized, with the noise canceled out. Such invalid data processing is performed by an arithmetic control unit 8 and controller 5 in an apparatus body 4.

Third Embodiment

In the first and second embodiments, the method of setting a proper sensor signal output timing for data output in image read operation by outputting a dummy clock in reference data acquiring operation has been described. A method of improving the noise removing effect will be described below.

As described above, in image read operation, as a data clock frequency in data output, an optimal frequency is selected for each resolution.

In this case, therefore, the frequency of a dummy data clock output in reference data acquiring operation is set to the same data clock frequency set for each resolution in image read operation when reference data for each resolution is acquired.

With this operation, as described above, noise (fixed noise) in a sensor output signal influenced by data clocks in image read operation and reference data acquiring operation can be canceled out, thus improving the noise removing effect.

As shown in FIG. 4, this dummy clock is output from the DTCK clock generation block/frequency selection block 51 described above after a dummy clock frequency is set by the arithmetic control unit 8 through the register block 53 in the image processing IC 21 in the same manner as described above.

Fourth Embodiment

A method of improving the noise removing effect by outputting dummy data as well as a dummy data clock in reference data acquiring operation will be described below.

The method of removing noise by outputting only a dummy data clock has been described above. In actual image read operation, data is always output. More specifically, output data consist of various combinations of "0s" and "1s" instead of all "0s" or all "1s" as in a case wherein data is output to a data output terminal in reference data acquiring operation. If, therefore, dummy data is output to the data output terminal in reference data acquiring operation as well, a state can be produced, which is as close to the state of data and the data clock output in image read operation as possible. This improves the noise removing effect.

Figure 10:
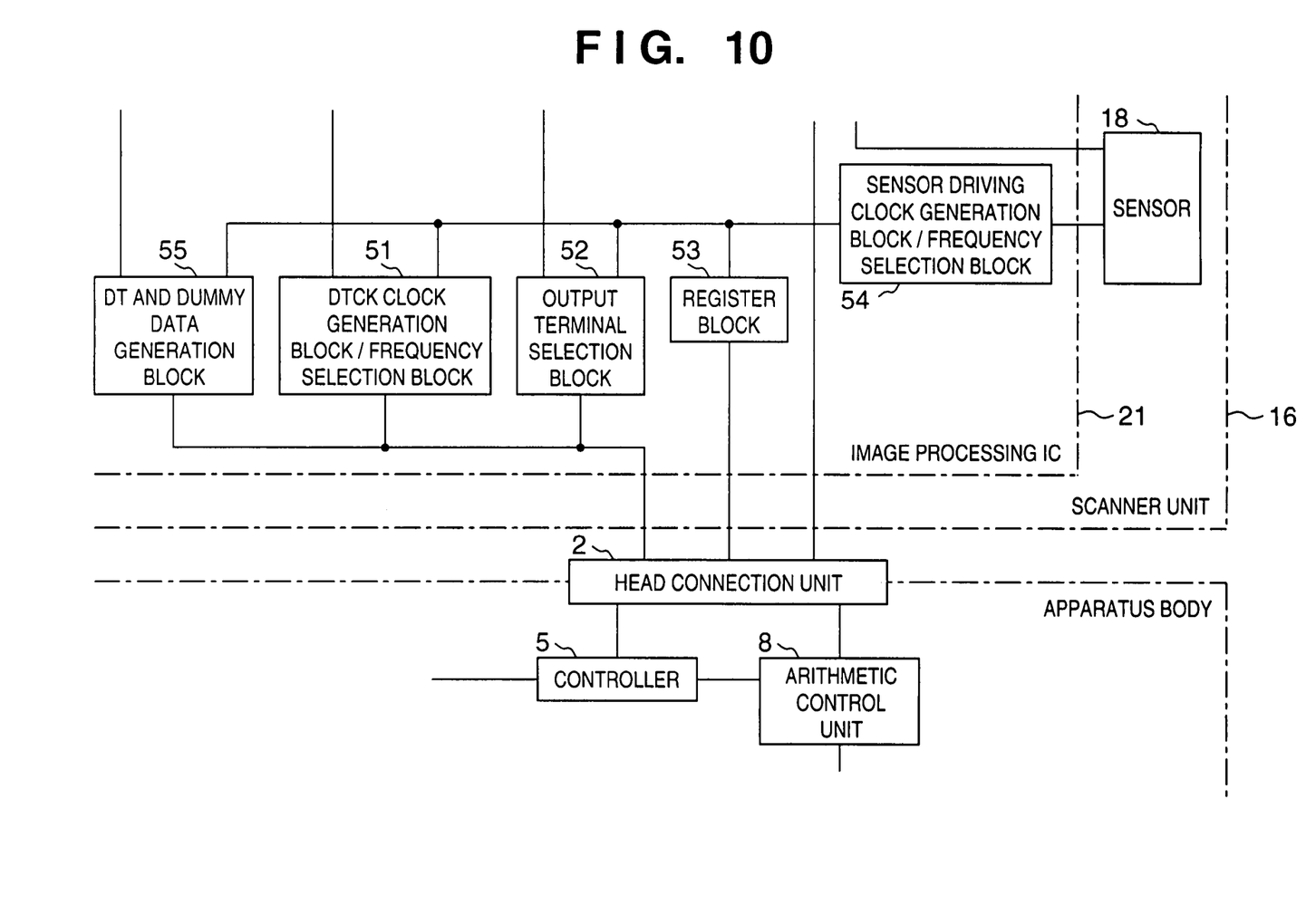
FIG. 10 is a view for explaining a dummy data output block.

As shown in FIG. 10, this dummy data is set by an arithmetic control unit 8 through a register block 53 in an image processing IC 21 and output from a dummy data generation block 55 as in the same manner described above.

Fifth Embodiment

In the fourth embodiment, there is no description of the contents of dummy data to be output in reference data acquiring operation. If, however, random signals are generated and reference values obtained by acquiring reference data a plurality of number of times are averaged, the noise removing effect can be improved.

In addition, the noise removing effect can be improved by outputting a pattern of alternately outputting "0" and "1" and a pattern of alternately outputting "1" and "0" as dummy data a plurality of number of times, acquiring reference data a plurality of number of times in the same manner as described above, and averaging the reference data. That is, patterns that produce a state which is as close to the state in image read operation as possible are output as dummy data.

Other Embodiments

The objects of the respective embodiments are also achieved by supplying a storage medium (or recording medium), which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention. The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the first to fifth embodiments, a high-quality image can be read with a high precision and high S/N ratio by canceling out noise based on digital signal processing which is superimposed on an effective portion of an analog signal. In addition, energy savings and reduction in radiation noise can be achieved.

The present invention is not limited to the above embodiments and various changes and modifications can be made within the spirit and scope of the present invention. Therefore, to apprise the public of the scope of the present invention the following claims are made.

What is claimed is:

1. An image reading apparatus comprising:
   an image reading unit adapted to read image data;
   a serial output unit adapted to output the image data read by said image reading unit in a serial form; and
   a plurality of parallel output units adapted to output the image data read by said image reading unit in a plurality of types of parallel forms.

2. The apparatus according to claim 1, wherein said image reading unit is mounted on an image reading apparatus main body so as to be interchangeable with a printhead for printing an image.

3. The apparatus according to claim 1, wherein said plurality of parallel output units are configured to output the image data in nth (n is an integer) power of two bits.

4. The apparatus according to claim 1, further comprising a switching unit adapted to switch said plurality of parallel output units in accordance with a read resolution of said image reading unit.

5. An image reading apparatus comprising:
   an image reading unit adapted to read an image;
   an output clock generating unit adapted to generate an output clock signal for outputting image data from said image reading unit; and
   a dummy clock generating unit adapted to generate a dummy clock similar to the output clock signal when said image reading unit reads a reference image.

6. The apparatus according to claim 5 further comprising:
   resolution setting unit adapted to set a resolution in image reading operation by said image reading unit;

read data acquiring unit adapted to acquire the image data in number corresponding to the set resolution; and timing setting unit adapted to match a timing of the output clock with a timing of the dummy clock in an interval during which the image is read and read data is output.

7. The apparatus according to claim 6, wherein said timing setting unit comprises an output bit count changing for unit adapted to change the number of output bits of the image data, and the number of output bits is changed to match the timing of the output clock with the timing of the dummy clock.

8. The apparatus according to claim 7, wherein said output bit count changing unit can change the number of bits to one in a serial output form and an integral power of two in a parallel output form.

9. The apparatus according to claim 6, wherein said timing setting unit comprises output clock frequency changing unit adapted to change a frequency of the output clock, and the frequency of the output clock is changed to match the timing of the output clock with the timing of the dummy clock.

10. The apparatus according to claim 6, wherein said timing setting unit comprises driving frequency changing unit adapted to change a driving frequency for a sensor for reading the image, and the driving frequency is changed to match the timing of the output clock with the timing of the dummy clock.

11. The apparatus according to claim 6, wherein said read data acquiring unit does not acquire as the image data a portion in which the timing of the output clock differs from the timing of the dummy clock.

12. An image reading method comprising the steps of:

reading image data; and selecting one of output unit in a serial form and output units in a plurality of types of parallel forms to output the image data read in the image data reading step.

13. An image reading method comprising the steps of:

reading an image;

generating an output clock signal for outputting image data read in the image reading step; and generating a dummy clock similar to the output clock signal when a reference image is read in the image reading step.

14. The method according to claim 13 further comprising the steps of:

setting a resolution in the image reading step;

acquiring the image data in number corresponding to the set resolution; and matching a timing of the output clock with a timing of the dummy clock in an interval during which the image is read and read data is output.

15. A storage medium storing a control program for controlling an image reading apparatus, wherein the control program comprises:

a code for a step of reading image data; and a code for a step of selecting one of output unit in a serial form and output units in a plurality of types of parallel forms to output the image data read in the image data reading step.

16. A storage medium storing a control program for controlling an image reading apparatus wherein the control program comprises:

a code for a step of reading an image;

a code for a step of generating an output clock signal for outputting image data read in the image reading step; and a code for a step of generating a dummy clock similar to the output clock signal when a reference image is read in the image reading step.

* * * * *